United States Patent [19]

Carlin

[11] Patent Number: 4,923,922
[45] Date of Patent: May 8, 1990

[54] ETHYL ALCOHOL PROCESS FOR POLYVINYL ACETATE PRODUCTION

[75] Inventor: Paolo Carlin, Rosolina, Italy

[73] Assignee: Tecnoassistance S.R.L., Rosolina, Italy

[21] Appl. No.: 113,930

[22] PCT Filed: Jan. 26, 1987

[86] PCT No.: PCT/IT87/00002
§ 371 Date: Nov. 19, 1987
§ 102(e) Date: Nov. 19, 1987

[87] PCT Pub. No.: WO87/04441
PCT Pub. Date: Jul. 30, 1987

[30] Foreign Application Priority Data
Jan. 28, 1986 [IT] Italy ................ 83309 A/86

[51] Int. Cl.$^5$ .............................................. C08F 16/06
[52] U.S. Cl. ..................................... 525/56; 525/62; 526/319
[58] Field of Search ............... 525/56, 62; 526/319

[56] References Cited
U.S. PATENT DOCUMENTS

| | | | |
|---|---|---|---|
| 3,234,195 | 2/1966 | Matsumoto et al. | 525/56 |
| 3,311,595 | 3/1967 | Kahrs et al. | 526/319 |
| 3,523,933 | 8/1970 | Inskip | 525/56 |
| 3,547,860 | 12/1970 | Roh et al. | 526/319 |
| 3,598,883 | 8/1971 | Nakamura et al. | 525/56 |
| 3,697,495 | 10/1972 | Bristol | 525/56 |
| 3,884,892 | 5/1975 | Winkler et al. | 525/62 |
| 4,324,878 | 4/1982 | Biaggi et al. | 526/200 |
| 4,401,790 | 8/1983 | ter Jung et al. | 525/56 |

*Primary Examiner*—Joseph L. Schofer
*Assistant Examiner*—J. M. Reddick
*Attorney, Agent, or Firm*—Wenderoth, Lind & Ponack

[57] ABSTRACT

Method for the preparation of a partially hydrolyzed polyvinyl acetate by polymerizing vinyl acetate in ethanolic solution at a vinyl acetate/ethanol weight ratio of lower than 0.7, cooling the solution until it separates into upper and lower phases, separating the lower phase containing polyvinyl acetate, and hydrolyzing the polyvinyl acetate. The resultant partially hydrolyzed polyvinyl acetate is suitable for use in polymerization of vinyl chloride in aqueous suspension.

6 Claims, No Drawings

ETHYL ALCOHOL PROCESS FOR POLYVINYL ACETATE PRODUCTION

The present invention relates to an ethyl alcohol process for polyvinyl acetate production It is well-known that the actual production of polyvinylchloride in suspension is principally based on the use of secondary suspending agents which are obtained from the partial hydrolysis of polyvinylacetate polymerized in methanol solution (methyl alcohol), or by partial hydrolysis of methanolic solutions of polyvinylacetate obtained by means of bulk polymerization.

It is well-known that the plastic material which can be obtained utilizing said suspending agents is a PVC containing toxic residue due to the presence of methyl alcohol and methylacetate.

The scope of this invention is to find a solution to allow production of PVC for foodstuffs and for pharmaceutical use, which is less toxic than traditional PVC materials.

It is important to point out that the production process of the polyvinylchloride in aqueous suspension leads to problems of toxicity due to the presence of methyl alcohol.

Different methods to produce polyvinylacetate with polymerization in ethyl alcohol are well-known in the prior art to avoid said drawbacks.

These well known methods have, however, demostrated that they are not sufficiently suitable, whether for the difficulties encountered in reaction or for the respective product quality.

Experts are aware that when, as an auxiliary suspending agent in the polymerization of vinylchloride monomer, a polyvinylacetate with a molecular weight expressed in K values (relative viscosity) between 20 and 30, and hydrolysis values equal to 45% mole OH, is used, a finished PVC-S (polyvinylchloride suspension) with excellent morphological characteristics, high internal porosity, low level of "fish-eyes" (colloidability), minimal residual gas of VCM (vinylchloride monomer) occluded in its particles, is obtained (see patent IT-020246; US-PS-4,324,878; European Patent 0002861).

At present, partially hydrolysed polyvinylacetate is supplied in solutions with methyl alcohol and ethyl methyl acetate which are highly toxic, and which contain all the fractions of molecular weights which form during polymerization in solution or in block of the polyvinyl acetate.

After long industrial experience, it has been noted that, together with the well-known advantages previously described, the use of these particular auxiliary suspending agents shows, apart from the problems of toxicity, precise phenomena of the formation of unwanted foaming during polymerization, and this happens if a reflux condenser is used, said drawback appearing in more effective incidence during degassing of the non-reacted VCM, when the reaction is interrupted, as is commonly done, at the conversion of 90–92% of the material into PVC-S. There are, besides, noted grave problems of colour of the PVS-S with a tendency towards a very pale yellow.

The inventor has discovered that all these damaging phenomena can be attributed to the fraction of low molecular weight materials present in partially hydrolyzed polyvinyl acetate which are used in PVC-S polymerization, without previous fractioning of the molecular weight materials themselves.

In order to avoid said drawbacks a particular object of this invention is consequently to supply a fractioning process of molecular weight materials of solutions of polyvinyl acetates at different levels of concentration in ethyl alcohol.

Ethyl alcohol has been shown to be the most suitable for this type of practical and economic fractioning, presenting further advantages becasuse it does not generate dangerous situations of toxicity in the industrial PVC-S production process and in the respective products to be utilized in pharmaceutical and foodstuffs fields.

A further object of this invention is to inexpensively improve the vinylchloride monomer polymerization in a suspension process, utilizing polyvinylacetate fractioned and hydrolyzed in ethyl alcohol.

The invention is intended to provide a remedy to the above-mentioned disadvantages. It solves the problem providing a method of polymerization of vinyl acetate monomer (AVM), within a weight ratio in AVM/ethyl alcohol less than 0.7, preferably between 0.3 and 0.7, preferably 0.45. In this way it is possible, at the end of reaction and after cooling to a temperature less than 24° C. and preferably less than 13° C., to allow phase separation so that the upper phase contains the lowest molecular weight materials and the lower phase contains medium high molecular weight materials, the first one being called phase "A" and the second one called phase "B"; said two phases being easily separated (A from B).

After separation, the upper phase (phase A) contains the low molecular weight polyvinyl acetate and, more precisely, the fraction with K value up to 21; the lower phase (phase B) containing the medium high molecular weight polyvinyl acetate and, more precisely, the fractions with K value higher than 21.

The inventor has further discovered the unexpected effect that, after separation of the phases, for example through decantation, hydrolyzing separately with acid techniques ($H_2SO_4$) said phase "A" product and said phase "B" product, up to hydrolysis values between 10% and 58%, preferably 45% mole OH, and using these product separately as auxiliary suspending agents in polymerization of vinylchloride monomer (VCM) in aqueous suspension, it is possible to obtain process conditions and quality of finished PVC-S which are very different from each other; these conditions have led to the following considerations and conclusion:

phase "A" is a principal factor responsible for damaging and uneconomic phenomena of formation of foam during polymerization and degassing of vinyl chloride monomer (VCM), and for the worsening of the final colour of PVS-S, involving further presence of very fine particles of PVC-S which have an apparently inferior density in respect to the average;

phase "B" on the contrary, if introduced separately into the load of polymerization of PVC-S, allows all the damaging and costly drawbacks described above to be eliminated. These drawbacks are noted when using all those partially hydrolyzed polyvinyl acetates now present in the world market, as they cannot be fractioned with the technique now described in the present invention.

In the last analysis, according to the invention, in order to obtain the industrial result of the above-mentioned scope, the process is developed in the following steps:

vinyl acetate monomer (AVM) is polymerized in a solution of ethyl alcohol so that the weight ratio is 45 parts of AVM and 100 of ethyl alcohol;

at the end of the polymerization the temperature of the solution is brought to 13° C. in order to obtain a quick and sharp separation of the phases;

decantation follows, in order to allow separation of the upper phase from the lower phase which is easily made, for example, through visualization means in the reactor. This is done because the two solutions thus differentiated show the polyvinyl acetate in ethyl alcohol at two different grades of solubility. Therefore the upper phase shows itself macroscopically with a sharp demarcation line, a different aspect from the lower phase. It is a division that can, however, be easily seen by the density difference, or by the refraction index difference or by the viscosity or other physical characteristics or a combination of all these differences, while the upper phase "A" can be utilized in other industrial applications, the lower phase "B" is hydrolyzed in acid or alkaline surroundings in order to obtain partially hydrolyzed polyvinyl acetate suitable for use in the processing of polyvinyl chloride in suspension (PVC-S).

The tests which follow make what has been described before even clearer.

Such tests listed in the summary tables which follow, serve to illustrate the concepts and applications of ths invention to the experts in the field, but should not be considered limits of the invention itself. In particular, tests 1 and 2 relate to well-known techniques with methyl alcohol, test 3 relates to a technique in ethyl alcohol in ratio conditions AVM/ethyl alcohol not allowing phase separation, test 4 (phase separation version A and B) relates to the present invention. All parts are calculated by weight.

TEST 1

In a glass testing autoclave (reactor) with a capacity of 3 liters, comprising heating jacket, reflux condenser and impeller agitator at 200 rpm, 100 parts of vinyl acetate, 100 parts of methyl alcohol and 1.8 parts of benzoyl peroxide were placed for reaction. At reflux temperature polymerization continued for three hours; after this, in another three hours 0.80 parts of dimyristylperoxide of carbonate, dissolved in 5 parts of methyl alcohol and 5 parts of methyl acetate were added. Once conversion into polyvinyl acetate equal to 99.75% was accomplished, the mass was rapidly cooled.

At a temperature of 13° C. no separation of phases was noted. The mass was then brought to reflux temperature, 2 parts of concentrated sulphuric acid dissolved in 5 parts of methyl alcohol were added and, after 130 minutes, neutralization with sodium hydrate dissolved in methyl alcohol up to a value of pH 6.8 followed.

The final polyvinyl acetate was partially hydrolyzed with values equal to 45% mole OH.

TEST 2

Test 1 was repeated in the same autoclave, with the following modifications:

in initial loading the vinyl acetate was reduced from 100 to 45 parts so as to obtain in the final polymerized mass a % of polyvinyl acetate equal to 31%:

after cooling to a temperature of 13° C. no separation of phases was noted. The procedure of hydrolysis followed with the same procedure of the preceding test 1.

TEST 3

In the same autoclave and with the same procedures as adopted for tests 1 and 2, 100 parts of vinyl acetate, 100 parts of ethyl alcohol and 0.45 parts of benzoyl peroxide was loaded for reaction.

After 4 hours of reaction a solution in ethyl alcohol and ethyl acetate of dimyristylperoxidedicarbonate calculated on the basis of dry substances equal to 0.50 parts was added in running. Conversion in polyvinyl acetate equal to 99.75% was reached after a further 2 hours and 30 minutes. After cooling to 13° C., no separation of phases was obtained in the mass containing 50% by weight of polyvinyl acetate. The process continued with the same procedure of the preceding tests 1 and 2.

The technique of hydrolysis formulation, process and grade of hydrolysis followed with the same procedure of the tests 1 and 2, except that methyl alcohol was substituted by ethyl alcohol.

TEST 4

In the same autoclave, test 3 was repeated with the following modifications:

in the initial loading the vinyl acetate was reduced from 100 to 45 parts;

benzoyl peroxide to 0.27 parts, the initial time of reaction was taken to 4 hours and 45 minutes and 0.27 parts of dimyristylperoxidecarbonate in the same concentration utilized in test 3 were added in a further two hours. When final conversion to 99.75% was reached the mass wwas cooled to 13° C. in accordance to the preceding tests:

In contrast to the preceding tests, separation into two phases was observed.

The upper phase (A) equal to about 45% of the total volume had the following analytical values: 15% solids; average K value of PVAC (polyvinyl acetate) 17.

The lower phase (B) equal to the remaining 55% of the total volume had the following analytical values: 48% solids; average K value of PVAc 27. Phases A and B was hydrolyzed separately with the same procedures of the prior test 3.

The partially hydrolyzed polyvinyl acetates obtained like in tests 1,2,3,4 were used in process tests of polyvinyl chloride production in a stainless steel reactor with a capacity of 1,500 liters, furnished with an "impeller" type agitator at 150 rpm and with 2 breaking poles. The reactor was furnished with visual inspection-holes for the control of foaming presence during degassing of the non-reacted gaseous vinyl chloride monomer, namely after fall in polymerization pressure equal to a Delta P (differential pressure) = 3.5 Kg/cmq and corresponding to a final conversion in polyvinyl chloride to 90-92%.

Polymerizations at a temperature of 54° C. with the new loading parameters and material give a PVC-S (type K70) suitable for the most sophisticated uses for plastified manufactures, flexible tubing, film for foodstuffs and pharmaceutical packing and others.

The same loading parameters for all the tests as shown in the attached tables are as follows: CVM (vinyl chloride monomer) = 100 pp.; demineralized water = 140 pp.; laurylperoxide = 0.02 pp.; dimyristylperoxide carbonate = 0,07 pp.; hydroxy-propyl-methyl-cellulose = 0.03 pp.; polyvinyl alcohol with K value = 39 and hydrolysis grade equal to 75 mole % OH = 0,05 pp.; auxiliary suspending agent produced as in test 1,2,3,4 (phase A) and 4 (phase B) = 0.06 pp.

All polymerization test were carried out under the same conditions; once a fall of reaction pressure of 3.5 Kg/cmq was reached, rapid degassing of the non-reacted gaseous vinyl chloride monomer was started, controlling the flux of gas and noting times so that, through the visual inspection holes, neither evident foaming or suspended polymer could be seen.

The following table, where operative conditions and analytical characteristics of the finished PVC-S have been reported, show that the formation of foam, consequent degassing times and the analytical characteristics of the finished product obtained from those which come from test 1,2 and 3 are similar to each other. This demonstrates that no difference exists between hydrolyzed solutions of polyvinyl acetate in methyl or ethyl alcohol where fractioning of molecular weight materials has not been carried out.

On the other hand, data tests 4A (use of upper phase) and 4B (use of lower phase) show that, when loading with 4A phase product, there is a consistent increase of foam, so much as to increase the degassing time to uneconomic values in the industrial processing of PVC-S, and at the same time the PVC-S itself is more porous, finer and with apparent density of no industrial interest in this direction. It must be concluded that phase A does not find valid applications if the polyvinyl acetate is partially hydrolyzed, and therefore phase A must be utilized towards hydrolysis to a concentration (total evaporation of ethyl alcohol) and use as polyvinyl acetate itself.

The polymerization test which uses partially hydrolyzed polyvinyl acetate which comes from test 4B (lower phase), has shown poor formation of foaming during degassing, with consequent diminution of degassing times, and the finished PVC-S has likewise been of a higher quality in respect to that obtained by partially hydrolyzed polyvinyl acetates utilizing tests 1,2,3,4A.

In fact, the last product (phase B product) has an apparent density of the PVC-S of 0.500 gr/cmc, and an internal porosity determined with a Carlo Erba mercury pressure porosimeter of 0.35 gr/cmc accompanied by a granulometric distribution of the PCV-S itself, where 92% is concentrated in the sieving interval from 100 to 140 mesh, that indicate a PVC-S with high morphological and chemico-physical characteristics.

The final colour of PVC-S after drying, is much whiter with respect to the others. This clearly demonstrates that the fraction of low polymers present in partially hydrolyzed polyvinyl acetates which are not fractioned, are the principal factors responsible for several phenomena of thermal instability in PVC-S.

TABLE A

| HYDROLYZED POLYVINYL ACETATE | | | | |
|---|---|---|---|---|
| Tests n. | 1 | 2 | 3 | 4 |
| Type of alcohol used in polymerization of PVCc in solution | CH3OH | CH3OH | C2H5OH | C2H5OH |
| Ratio AVM/ALCOHOL | 1 | 0.45 | 1 | 0.45 |
| % alcohol solution solids at end of polymerization | 50 | 31 | 50 | 31 |
| Separation of phases of solution after cooling to 13° C. | NO | NO | NO | YES |

TABLE A

| Tests n. | 1 | 2 | 3 | 4A | 4B |
|---|---|---|---|---|---|
| % solids after separation of phase | — | — | — | 15 | 48 |
| Average K value of PVC before acid hydrolisis | 25 | 25 | 25 | 17 | 27 |
| mole % OH after partial hydrolysis of PVAc | 45 | 45 | 45 | 45 | 45 |

| CONDITIONS OF POLYMERIZATION VINYL-CHOLORIDE MONOMER AND ANALYSIS OF FINISHED PVC-S | | | | | |
|---|---|---|---|---|---|
| VCM pp | 100 | 100 | 100 | 100 | 100 |
| Demineralized H2O pp | 140 | 140 | 140 | 140 | 140 |
| Laurylperoxide pp | 0.02 | 0.02 | 0.02 | 0.02 | 0.02 |
| Dimyristylperoxide pp | 0.07 | 0.07 | 0.07 | 0.07 | 0.07 |
| Hydroxpropylmethylcellulose pp | 0.03 | 0.03 | 0.03 | 0.03 | 0.03 |
| PVA K39 75% mole OH pp | 0.05 | 0.05 | 0.05 | 0.05 | 0.05 |
| Auxiliary suspending agent as per tests | 0.06 | 0.06 | 0.06 | 0.06 | 0.06 |
| % Final conversion | 91 | 92 | 90 | 91 | 92 |
| Degassing time of non-reacted VCM in mins. | 65 | 60 | 68 | 115 | 25 |
| Presence of foam during degassing | YES | YES | YES | IMPORTANT | POOR |
| Type PVC-S value K | 70 | 70 | 70 | 70 | 70 |
| Apparent density gr/cmc | 0.470 | 0.475 | 0.475 | 0.450 | 0.500 |
| Internal porosity cmc/gr | 0.36 | 0.35 | 0.36 | 0.40 | 0.35 |
| Colour of PVC-S after stripping and drying 10 = very white 4 = slightly yellow | 7 | 7 | 7 | 4 | 10 |

| GRANULOMETRIC DISTRIBUTION | | | | | |
|---|---|---|---|---|---|
| Residue on 60 mesh % | 0 | 0 | 0 | 0 | 0 |
| Residue on 100 mesh % | 10 | 9 | 11 | 6 | 18 |
| Residue on 140 mesh % | 66 | 66 | 61 | 45 | 74 |
| Residue on 200 mesh % | 20 | 22 | 23 | 34 | 7 |
| Bottom inf. 75 micron % | 4 | 3 | 5 | 15 | 1 |

I claim:

1. A method for the preparation of a partially hydrolyzed polyvinyl acetate, suitable for polymerization of vinyl chloride in aqueous suspension, which comprises:
   (a) polymerizing vinyl acetate in ethanolic solution under reflux at a weight ratio of vinyl acetate/ethanol of lower than 0.7,
   (b) cooling the ethanolic solution of polyvinyl acetate prepared according to step (a) until said solution distinctly separates into an upper phase and a lower phase,
   (c) separating said lower phase containing polyvinyl acetate having a K value of higher than 21 from said upper phase, and
   (d) hydrolyzing said polyvinyl acetate under acidic or basic conditions to obtain the partially hydrolyzed polyvinyl acetate.

2. The method according to claim 1 wherein the hydrolysis in step (d) is carried out until the polyvinyl acetate has a hydrolysis degree of between 10 and 58 mole %.

3. The method according to claim 1 wherein the ethanolic solution obtianed in step (a) is cooled to a temperature of below 24° C. in step (b).

4. The method according to claim 3 wherein the ethanolic solution is cooled to a temperature of about 13° C.

5. The method according to claim 2 wherein the ethanolic solution obtained in step (a) is cooled to a temperature of below 24° C. in step (b).

6. The method according to claim 5 wherein the ethanolic solution is cooled to a temperature of about 13° C.

* * * * *